United States Patent [19]
Yano et al.

[11] Patent Number: 5,830,820
[45] Date of Patent: Nov. 3, 1998

[54] OLEFIN POLYMERIZATION CATALYST AND OLEFIN POLYMERIZATION PROCESS

[75] Inventors: Akihiro Yano; Morihiko Sato, both of Yokkaichi, Japan

[73] Assignee: Tosoh Corporation, Yamaguchi-ken, Japan

[21] Appl. No.: 816,325

[22] Filed: Mar. 13, 1997

Related U.S. Application Data

[63] Continuation of Ser. No. 357,733, Dec. 16, 1994, abandoned.

[30] Foreign Application Priority Data

Dec. 17, 1993 [JP] Japan .................................. 5-317965

[51] Int. Cl.$^6$ .............................. C08F 4/02; C08F 10/00
[52] U.S. Cl. ......................... 502/62; 502/120; 526/129; 526/348.6; 526/352
[58] Field of Search ....................................... 502/62, 120

[56] References Cited

U.S. PATENT DOCUMENTS 4,666,877  5/1987  Vaughan .
5,369,196  11/1994  Matsumoto et al. .................... 526/160
5,444,134  8/1995  Matsumoto ............................ 526/160

FOREIGN PATENT DOCUMENTS 0511665  11/1992  European Pat. Off. .
 511665  11/1992  European Pat. Off. .

*Primary Examiner*—Edward J. Smith
*Attorney, Agent, or Firm*—Sughrue, Mion, Zinn, Macpeak & Seas, PLLC

[57] ABSTRACT

Analyst for polymerization of olefin is provided which comprises a clay mineral (a) having been modified with a compound (b) capable of introducing a cation into layer interspaces in the clay mineral; a metallocene compound (c); and an organoaluminum compound (d). This catalyst is inexpensive and yet has excellent activity for polymerization of olefin. The process for polymerization or copolymerization of olefins is also provided.

12 Claims, No Drawings

OLEFIN POLYMERIZATION CATALYST AND OLEFIN POLYMERIZATION PROCESS

This is a Continuation of application Ser. No. 08/357,733 filed Dec. 16, 1994, now abandoned.

BACKGROUND OF THE INVENTION

1. Field of the Invention:

The present invention relates to an olefin polymerization catalyst which comprises a modified clay, a metallocene compound, and an organoaluminum compound. The present invention also relates to an olefin polymerization process employing the above catalyst.

2. Description of the Related Art:

In production of polyolefins by polymerization of olefin, catalysts are known which are constituted of a combination of a transition metal compound and an organometallic compound. Kaminsky, et al. disclosed that a catalyst formed from a metallocene and methylaluminoxane has high activity in polymerization of olefin including propylene in JP-A (Japanese Patent Application Laid-Open No.) 58-19309.

The catalyst systems employed in the above patent publications, although they have excellent activity for polymerization, are used usually for solution polymerization owing to the solubleness of the catalyst in the reaction systems. Further, in the catalyst system, the relatively expensive methylaluminoxane need to be used in a large quantity to produce an industrially useful polymer, which involves the disadvantages of high production cost and much aluminum residue in the resulting polymer.

On the other hand, JP-A-60-35006, etc. disclose catalyst systems which comprise the aforementioned soluble catalyst supported on an inorganic oxide carrier like silica. Such catalysts, however, do not have sufficient polymerization activity per unit weight of methylaluminoxane.

To improve the activity per unit weight of methylaluminoxane, JP-A-4-8704, JP-A-4-11604, and JP-A-4-213305, for example, disclose a catalyst system containing a metallocene and less methylalminoxane modified by prepolymerization, for gas phase polymerization, which gives a polymer having satisfactory particle properties with high polymerization catalytic activity. However, the catalyst activity was not sufficient, although the amount of methylaluminoxane is reduced.

In recent years, novel cocatalysts without an organoaluminumoxy compound like organoaluminumoxy compounds are being investigated. For example, Japanese Kohyo-1-501950 and Japanese Kohyo 1-502036 disclose special boron compounds as an effective cocatalyst. These boron compounds, which have a complicated structure, do not solve the problem of the cost.

After comprehensive studies by the inventors of the present invention to solve the above problems, it was found that a highly active polyolefin polymerization catalyst is obtained from a modified clay mineral having been treated with a compound capable of introducing a cation into the interspaces between the layers in the clay mineral structure, a metallocene compound, and an organoaluminum compound, and the present invention has been accomplished.

SUMMARY OF THE INVENTION

The present invention intends to provide an olefin polymerization catalyst which does not employ an expensive organoaluminumoxy compound or boron compound and has high polymerization catalytic activity with low cost.

The present invention also intends to provide a process for polymerization of an olefin employing the above catalyst.

The catalyst of a first embodiment of the present invention comprises a clay mineral (a) having been modified with a compound (b) capable of introducing a cation into layer interspaces in the clay mineral; a metallocene compound (c); and an organoaluminum compound (d).

The catalyst of a second embodiment of the present invention comprises a first catalyst component prepared by prepolymerizing an olefin with a catalyst composed of a clay mineral (a) having been modified with a compound (b) capable of introducing a cation into layer interspaces in the clay mineral, a metallocene compound (c), and a first organoaluminum compound (d); and, as a second catalyst component, a second organoaluminum compound (e).

The process for olefin polymerization of the present invention is conducted by using the above catalyst.

DETAILED DESCRIPTION OF THE PREFERRED EMBODIMENTS

The clay mineral (a) employed in the present invention is in a form of fine particles mainly composed of a fine crystalline silicate salt. Clay minerals generally have a characteristic layer structure, containing between the layers, various levels of negative charges. In this respect, the clay mineral is substantially different from metal oxides having a three-dimensional structure such as silica, alumina, and zeolite. The clay minerals are classified according to the levels of the aforementioned negative charge for the chemical formula: (1) biophilite, kaolinite, dickalite, and talc having the negative charge of 0 (zero), (2) smectite having the negative charge of from 0.25 to 0.6, (3) vermiculite having the negative charge of from 0.6 to 0.9, (4) mica having the negative charge of about 1, and (5) brittle mica having the negative charge of about 2. The each of the above groups includes various minerals. For example, the smectite group include montmorillonite, bidelite, saponite, hectorite, etc. These clay minerals exist in nature, and also can be synthesized artificially with a higher purity. Any of the natural and artificial clay minerals is useful in the present invention. Any substance which belongs to the clay minerals by definition is useful in the present invention even if it is not mentioned above.

The compound (b) capable of introducing a cation into the interspaces between the layers in the clay mineral structure is represented by the general formula below:

where $(C^+)$ is a cation and $(A^-)$ is an anion.

The cation $(C^+)$ includes the ones having an active proton, namely Brønsted acids, such as trimethylammonium, triethylammonium, tripropylammonium, tributylammonium, N,N-dimethylanilinium, N,N-diethylanilinium, N,N-2,4,5-pentamethylanilinium, triphenylphosphonium, tri(o-tolyl)phosphonium, tri(p-tolyl)phosphonium, tri(mesityl)phosphonium, dimethyloxonium, diethyloxonium, and the like; the ones having no active proton such as carbonium ions, oxonium ions, and sulfonium ions, more specifically triphenylcarbenium ion, tropylium ion, etc.; and silver ion and ferrocenium ion, but are not limited thereto.

The anion $(A^-)$ is exemplified by halide ions including fluoride ion, chlorine ion, bromide ion, and iodide ion; sulfate ion, hexafluorophosphate,ion., tetrafluoroborate ion, tetraphenylborate ion, and the like, but is not limited thereto.

The specific examples of the above compound includes specifically hydrochlorides, hydrofluorides, hydrobromides, and hydroiodides of trimethylamine, triethylamine, tripropylamine, tributylamine, N,N-dimethylaniline, N,N,-diethylaniline, and N,N-2,4,5-pentamethylaniline; hydrobromides, hydrochlorides, hydroiodides, and hydrofluorides of triphenylphosphine, tri(o-tolyl)phosphine, tri(p-tolyl)phosphine, and tri(mesityl)phosphine; bromotriphenylmethane, chlorotriphenylmethane, tropylium bromide, ferrocenium sulfate, ferrocenium hexafluorophosphate, ferrocenium tetraphenylborate, and the like, but are not limited thereto.

The metallocene compound (c) employed in the present invention is represented by the general formula (1) or (2):

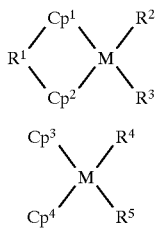

wherein $Cp^1$, $Cp^2$, $Cp^3$, and $Cp^4$ are independently a substituted or unsubstituted cyclopentadienyl group; $R^1$ is a alkylene group, a substituted alkylene group, a dialkylsilanediyl group, dialkylgermanediyl group, an alkylphosphinediyl group, or an alkylimino group, $R^1$ crosslinking $Cp^1$ and $Cp^2$ together; M is a transition metal of Group IVB of Periodic Table; and $R^2$, $R^3$, $R^4$, and $R^5$ are independently a hydrogen atom, a halogen atom, or a hydrocarbon, alkoxy, .or aryloxy group having 1 to 12 carbons.

In the above general formulas, the halogen includes fluorine, chlorine, bromine, and iodine. The hydrocarbon group of 1 to 12 carbons includes alkyl groups, cycloalkyl groups, aryl groups, and aralkyl groups. Specifically the alkyl groups include methyl, ethyl, propyl, isopropyl, and butyl. The cylcoalkyl groups include cyclohexyl. The aryl groups include phenyl, and tolyl. The aralkyl groups include benzyl, and neophyl. The alkoxy groups include methoxy, and ethoxy. The aryloxy groups include phenoxy group.

The specific Examples of the metallocene compound include:

bis(cyclopentadienyl)zirconiumdimethyl,
bis(methylcyclopentadienyl)zirconiumdimethyl,
bis(butylcyclopentadienyl)zirconiumdimethyl,
bis(1,3-dimethylcyclopentadienyl)zirconiumdimethyl,
bis(indenyl)zirconiumdimethyl,
bis(pentamethylcyclopentadienyl)zirconiumdimethyl,
ethylenebis(indenyl)zirconiumdimethyl,
dimethylsilanediylbis(indenyl)zirconiumdimethyl,
ethylenebis(tetrehydroindenyl)zirconiumdimethyl,
isopropylidene(cyclopentadienyl-1-fluorenyl) zirconiumdimethyl,
diphenylmethylene(cyclopentadienyl-1-fluorenyl) zirconiumdimethyl,
dimethylsilanediylbis(2,4,5-trimethylcyclopentadienyl) zirconiumdimethyl,
dimethylsilanediylbis(2,4-dimethylcyclopentadienyl) zirconiumdimethyl,
dimethylsilanediylbis(3-methylcyclopentadienyl) zirconiumdimethyl,
bis(cyclopentadienyl)zirconium dichloride,
bis(methylcyclopentadienyl)zirconium dichloride,
bis(butylcyclopentadienyl)zirconium dichloride,
bis(1,3-dimethylcyclopentadienyl)zirconium dichloride,
bis(indenyl)zirconium dichloride,
bis(pentamethylcyclopentadienyl)zirconium dichloride,
ethylenebis(indenyl)zirconium dichloride,
dimethylsilanediylbis(indenyl)zirconium dichloride,
ethylenebis(tetrahydroindenyl)zirconium dichloride,
isopropylidene(cyclopentadienyl-1-fluorenyl)zirconium dichloride,
diphenylmethylene(cyclopentadienyl-1-fluorenyl)zirconium dichloride,
dimethylsilanediylbis(2,4,5-trimethylcyclopentadienyl) zirconium dichloride,
dimethylsilanediylbis(2,4-dimethylcyclopentadienyl) zirconium dichloride,
dimethylsilanediylbis(3-methylcyclopentadienyl)zirconium dichloride,
bis(cyclopentadienyl)zirconiumdiphenyl,
bis(methylcyclopentadienyl)zirconiumdiphenyl,
bis(butylcyclopentadienyl)zirconiumdiphenyl,
bis(1,3-dimethylcyclopentadienyl)zirconiumdiphenyl,
bis(indenyl)zirconiumdiphenyl,
bis(pentamethylcyclopentadienyl)zirconiumdiphenyl,
ethylenebis(indenyl)zirconiumdiphenyl,
dimethylsilanediylbis(indenyl)zirconiumdiphenyl,
ethylenebis(tetrahydroindenyl)zirconiumdiphenyl,
isopropylidene(cyclopentadienyl-1-fluorenyl)zirconium-diphenyl,
diphenylmethylene(cyclopentadienyl-1-fluorenyl) zirconium-diphenyl,
dimethylsilanediylbis(2,4,5-trimethylcyclopentadienyl) zirconium-diphenyl,
dimethylsilanediylbis(2,4-dimethylcyclopentadienyl) zirconiumdiphenyl,
dimethylsilanediylbis(3-methylcyclopentadienyl) zirconiumdiphenyl,
bis(cyclopentadienyl)zirconiumdibenzyl,
bis(methylcyclopentadienyl)zirconiumdibenzyl,
bis(butylcyclopentadienyl)zirconiumdibenzyl,
bis(1,3-dimethylcyclopentadienyl)zirconiumdibenzyl,
bis(indenyl)zirconiumdibezyl,
bis(pentamethylcyclopentadienyl)zirconiumdibenzyl,
ethylenebis(indenyl)zirconiumdibenzyl,
dimethylsilanediylbis(indenyl)zirconiumdibenzyl,
ethylenebis(tetrahydroindenyl)zirconiumdibenzyl,
isopropylidene(cyclopentadienyl-1-fluorenyl) zirconiumdibenzyl,
diphenylmethylene(cyclopentadienyl-1-fluorenyl) zirconiumdibenzyl,
dimethylsilanediylbis(2,4,5-trimethylcyclopentadienyl) zirconiumdibenzyl,
dimethylsilanediylbis(2,4-dimethylcyclopentadienyl) zirconiumdibenzyl,
dimethylsilanediylbis(3-methylcyclopentadienyl) zirconiumdibenzyl,
bis(cyclopentadienyl)methoxyzirconium monochloride,
bis(methylcyclopentadienyl)methoxyzirconium monochloride,
bis(butylcyclopentadienyl)methoxyzirconium monochloride,
bis(1,3-dimethylcyclopentadienyl)methoxyzirconium monochloride,
bis(indenyl)methoxyzirconium monochloride,
bis(pentamethylcyclopentadienyl)methoxyzirconium monochloride,
ethylenebis(indenyl)methoxyzirconium monochloride,
dimethylsilanediylbis(indenyl)methoxyzirconium monochloride,
ethylenebis(tetrahydroindenyl)methoxyzirconium monochloride,
isopropylidene(cyclopentadienyl-1-fluorenyl) methoxyzirconium monochloride, diphenylmethylene(cyclopentadienyl-1-fluorenyl) methoxyzirconium monochloride,
dimethylsilanediylbis(2,4,5-trimethylcyclopentadienyl) methoxyzirconium monochloride,
dimethylsilanediylbis(2,4-dimethylcyclopentadienyl) methoxyzirconium monochloride,
dimethylsilanediylbis(3-methylcyclopentadienyl) methoxyzirconium monochloride,
bis(cyclopentadienyl)methylzirconium monochloride,
bis(methylcyclopentadienyl)methylzirconium monochloride,
bis(butylcyclopentadienyl)methylzirconium monochloride,
bis(1,3-dimethylcyclopentadienyl)methylzirconium monochloride,
bis(indenyl)methylzirconium monochloride,
bis(pentamethylcyclopentadienyl)methylzirconium monochloride,
ethylenebis(indenyl)methylzirconium monochloride,
dimethylsilanediylbis(indenyl)methylzirconium monochloride,
ethylenebis(tetrahydroindenyl)methylzirconium monochloride,
isopropylidene(cyclopentadienyl-1-fluorenyl) methylzirconium monochloride,
diphenylmethylene(cyclopentadienyl-1-fluorenyl) methylzirconium monochloride,
dimethylsilanediylbis(2,4,5-trimethylcyclopentadienyl) methylzirconium monochloride,
dimethylsilanediylbis(2,4-dimethylcyclopentadienyl) methylzirconium monochloride, and
dimethylsilanediylbis(3-methylcyclopentadienyl) methylzirconium monochloride;

and metallocene compounds which are derived by replacing zirconium in the above compounds with titanium or hafnium.

The organoaluminum compounds (d) and (e) employed in the present invention are represented by the general formula below:

$$Al(R^6)_3$$

wherein each $R^6$ is independently hydrogen, halogen, an amido group, an alkyl group, an alkoxy group, or an aryl group, and at least one $R^6$ is an alkyl group. The specific examples of the organoaluminum compound include trimethylaluminum, triethylaluminum, tri(n-propyl) aluminum, triisopropylaluminum, tri(n-butyl)aluminum, triisobutylaluminum, tri(t-butyl)aluminum, triamylaluminum, dimethylaluminum chloride, diethylaluminum chloride, diisobutylaluminum chloride, di(t-butyl) aluminum chloride, diamylaluminum chloride, methylaluminum dichloride, ethylaluminum dichloride, isobutylaluminum dichloride, t-butylaluminum dichloride, and amylaluminum dichloride, but the organoaluminum compound is not limited thereto.

The olefin polymerization catalyst of the present invention comprises, as a component, a clay mineral (a) modified by a compound (b). The conditions of the reaction of the clay mineral (a) with the compound (b) are not specially limited, and the ratio of the amount of (a) to (b) is not specially limited also. If any cation exists in the clay mineral (a), the cation is preferably allowed to react with equimolar or more of the compound (b). The reaction solvent may be a usual organic solvent such as benzene, toluene, xylene, pentane, hexane, methylene chloride, and the like, and water may also be used. Of these solvents, particularly preferred are those which are capable of swelling the clay.

The order of or the method of addition of the above modified clay mineral, the metallocene compound (c), and the organoaluminum compound (d) is not specially limited. In order to lower an adverse effect of impurity in the clay mineral, preferably the modified clay mineral is firstly brought into contact with the aluminum compound (d).

In the prepolymerization also, the order of or the method of addition of the above modified clay mineral, the metallocene compound (c), and the organoaluminum compound (d) is not specially limited. In order to lower an adverse effect of impurity in the clay mineral, preferably the modified clay mineral is firstly brought into contact with the aluminum compound (d). The olefin employed in the prepolymerization is not specially limited, and α-olefins such as ethylene, propylene, 1-butene, 4-methyl-1-pentene, and 1-hexene are preferably used. The solvent for the prepolymerization, when it is conducted in a liquid phase, may be any usual organic solvent. The solvent includes specifically benzene, toluene, xylene, pentane, hexane, methylene chloride, etc. The olefin itself may be used as the solvent. The concentration of α-olefin, reaction temperature, and other reaction conditions are not specially limited.

The amounts and the ratios of the three components of the catalyst of the present invention are also not specially limited. Preferably, the clay mineral is used in an amount sufficient for the reaction with the metallocene compound (c).

The olefin polymerizable by the catalyst of the present invention includes α-olefins such as ethylene, propylene, 1-butene, 4-methyl-1-pentene, and 1-hexene; conjugated and unconjugated dienes such as butadiene, and 1,4-hexadiene; and cyclic dienes such as styrene and cyclobutene. The olefin may be a mixture of two or more of the above olefins.

The olefin polymerization in the present invention may be conducted either in a liquid phase or a gas phase. In the liquid phase polymerization, the solvent may be any organic solvent used generally in liquid-phase polymerization, including specifically benzene, toluene, xylene, pentane, hexane, and methylene chloride, and also the olefin itself.

The polymerization temperature is in the range of from −100° to 300° C., but is not limited thereto.

The present invention is described below in more detail by reference to Examples without limiting the invention thereto in any way.

The procedures of polymerization, reaction, and solvent purification were conducted in an inert atmosphere. The solvent used in the reaction was purified, dried, and/or deoxidized preliminarily in a conventional method. The compounds used in the reactions were synthesized and identified in conventional methods.

The bulk density was measured according to JIS K-6721. The MFR (melt flow rate) was measured according to ASTM D-1238 (Condition E).

EXAMPLE 1

(Preparation of Modified Clay)

At a room temperature, 0.56 g of ferrocene was reacted with 6 ml of concentrated sulfuric acid for one hour. The resulting solution was added to 150 ml of water. This mixture was added at room temperature to 150 ml of water containing 3.3 g of synthetic high-purity montmorillonite (trade name: Kunipia, produced by Kunimine Kogyo K.K.). The solid matter was collected by filtration, washed with water, and dried under a reduced pressure of $10^{-5}$ Torr at room temperature for 24 hours to obtain modified clay.

(Polymerization)

In a 1-liter glass autoclave, after nitrogen purge, was placed 300 ml of toluene. Thereto, was added successively 250 mg of the modified clay obtained above, 3.8 mmol of triisobutylaluminum, and 17 µmol of ethylenebis(indenyl) zirconium dichloride. Ethylene was introduced thereto to keep the pressure at 2.5 kg/cm² to allow the polymerization to proceed with stirring at 60° C. for one hour. After the polymerization, unreacted ethylene was removed, and the reaction mixture was poured into ethanol to obtain 15 g of polymer.

EXAMPLE 2

(Preparation of Modified Clay)

Into a solution of 0.55 g of dimethylanilium chloride ($Me_2PhNHCl$) in 100 ml of water, was added 1.9 g of synthetic high-purity montmorillonite (trade name: Kunipia, produced by Kunimine Kogyo K.K.). The mixture was filtered, and the collected solid matter was washed with water, and dried under a reduced pressure of $10^{-5}$ Torr at room temperature for 24 hours to obtain modified clay.

(Polymerization)

The polymerization was conducted in the same manner as in Example 1 except that 250 mg of the above modified clay was used. Consequently, 20 g of a polymer was obtained.

COMPARATIVE EXAMPLE 1

(Polymerization)

The polymerization was conducted in the same manner as in Example 1 except that the modified clay was replaced with silica (#948, produced by Fuji Silicia Co.) which had been dried at a reduced pressure of $10^{-5}$ Torr at room temperature for 24 hours. Consequently, only 2 g of polymer was obtained.

COMPARATIVE EXAMPLE 2

(Polymerization)

The polymerization was conducted in the same manner as in Example 1 except that the modified clay was replaced with synthetic high-purity montmorillonite (trade name: Kunipia, produced by Kunimine Kogyo K.K.) which had been dried at a reduced pressure of $10^{-5}$ Torr at room temperature for 24 hours. Consequently, only 1.5 g of polymer was obtained.

EXAMPLE 3

(Polymerization)

In a 2-liter stainless-steel autoclave, after nitrogen purge, was placed 500 ml of toluene. Thereto, was added successively 14 mg of the modified clay prepared in Example 1, 0.6 mmol of triisobutylaluminum, and 1.0 µmol of ethylenebis (indenyl)zirconium dichloride. Ethylene was introduced thereto to keep the pressure at 4 kg/cm² to allow the polymerization to proceed with stirring at 80° C. for one hour. After the polymerization, unreacted ethylene was removed, and the reaction mixture was poured into ethanol to obtain 55 g of polymer.

EXAMPLE 4

At room temperature, 0.26 g of ferrocene was reacted with 3 ml of concentrated sulfuric acid for one hour. The resulting solution was added to 150 ml of water. This mixture was added to 350 ml of water containing 1.5 g of synthetic hectorite (trade name: Laponite, produced by Nippon Silica Kogyo K.K.). The solid matter was collected by filtration, washed with water, and dried under a reduced pressure of $10^{-5}$ Torr at room temperature for 24 hours to obtain modified clay.

(Polymerization)

The polymerization was conducted in the same manner as in Example 3 except that the modified clay prepared above was used. Consequently, 89 g of polymer was obtained.

EXAMPLE 5

(Polymerization)

The polymerization was conducted in the same manner as in Example 4 except that 1.0 µmol of dimethylsilanediylbis (indenyl)zirconium dichloride was used in place of ethylenebis(indenyl)zirconium dichloride. Consequently, 50 g of a polymer was obtained.

EXAMPLE 6

(Preparation of Modified Clay)

0.44 Gram of dimethylanilinium chloride($Me_2PhNHCl$) was added to 100 ml of water. Thereto 2.0 g of synthetic hectorite (trade name: Laponite, produced by Nippon Silica Kogyo K.K.). The solid matter was collected by filtration, washed with water, and dried under a reduced pressure of $10^{-5}$ Torr at room temperature for 24 hours to obtain washed with water, and dried under a reduced pressure of $10^{-5}$ Torr at room temperature for 24 hours to obtain modified clay.

(Polymerization)

The polymerization was conducted in the same manner as in Example 3 except that the modified clay prepared above was used. Consequently, 60 g of polymer was obtained.

EXAMPLE 7

(Polymerization)

A 2-liter stainless-steel autoclave equipped with a magnetic stirrer was purged sufficiently with nitrogen. Therein, 200 g of sodium chloride which had been dried at 200° C. for 20 hours as the dispersion medium, and the internal temperature was adjusted to 75° C. Then a mixture of 40 mg of the modified clay prepared in Example 6, 3.0 µmol of dimethylsilanediylbis(indenyl)zirconium chloride, and 5.5 mmol of triisobutylaluminum was charged into the autoclave. Immediately, gaseous ethylene was introduced thereto continuously to keep the internal pressure of the autoclave at 8 kg/cm²G to allow the polymerization to proceed at 80° C. for 30 minutes. After the end of the polymerization, the autoclave was cooled, the unreacted gas was removed, and the mixture of the formed polymer and the sodium chloride was taken out. The mixture was washed with pure water to dissolve off the sodium chloride. The undissolved matter was dried to obtain 37 g of polymer.

EXAMPLE 8

(Polymerization)

Ethylene was polymerized in the same manner as in Example 7 except that bis(1,3-dimethylcyclopentadienyl)

zirconium dichloride was used in place of dimethylsilanediylbis(indenyl)zirconium dichloride. Consequently, 25 g of a polymer was obtained.

EXAMPLE 9

(Preparation of Prepolymeric Catalyst)

In a 1-liter glass autoclave, after nitrogen purge, was placed 300 ml of toluene. Thereto, was added successively 1.0 g of the modified clay prepared in Example 1, 15.0 mmol of triisobutylaluminum, and 68 $\mu$mol of ethylenebis(indenyl) zirconium dichloride. Ethylene was introduced thereto to keep the pressure at 2.5 kg/cm$^2$ to allow the prepolymerization to proceed with stirring at 60° C. for 2 hour. After the prepolymerization, the solvent was eliminated by a filter e.g. a bridge or stick filter, and the solid matter was washed five times with 200 ml portions of hexane. Consequently, a prepolymeric catalyst containing 47 g of polyethylene per gram of the modified clay was obtained.

(Polymerization)

A 2-liter stainless-steel autoclave equipped with a magnetic stirrer was purged sufficiently with nitrogen. Therein, 200 g of sodium chloride which had been dried at 200° C. for 20 hours as the dispersion medium, and the internal temperature was adjusted to 75° C. Then a mixture of the prepolymeric catalyst (2.3 $\mu$mol in terms of zirconium) prepared above and 3.0 mmol of triisobutylaluminum was charged into the autoclave. Immediately, gaseous ethylene was introduced thereto continuously to keep the internal pressure of the autoclave at 8 kg/cm$^2$G to allow the polymerization to proceed at 80° C. for 30 minutes. After the end of the polymerization, the autoclave was cooled, the unreacted gas was removed, and the mixture of the formed polymer and the sodium chloride was taken out. The mixture was washed with pure water to dissolve off the sodium chloride. The undissolved matter was dried to obtain 28 g of polymer.

EXAMPLE 10

(Preparation of Prepolymeric Catalyst)

In a 1-liter glass autoclave, after nitrogen purge, was placed 300 ml of toluene. Thereto, was added successively 0.25 g of the modified clay obtained in Example 2, 3.8 mmol of triisobutylaluminum, and 17 $\mu$mol of ethylenebis(indenyl) zirconium dichloride. Ethylene was introduced thereto to keep the pressure at 2 kg/cm$^2$ to allow the prepolymerization to proceed with stirring at 60° C. for one hour. After the prepolymerization, the solvent was eliminated by a filter e.g. a bridge or stick filter, and the solid matter was washed five times with 200 ml portions of hexane. Consequently, a prepolymeric catalyst containing 20 g of polyethylene per gram of the modified clay was obtained.

(Polymerization)

A 2-liter stainless-steel autoclave equipped with a magnetic stirrer was purged sufficiently with nitrogen. Therein, 200 g of sodium chloride which had been dried at 200° C. for 20 hours as the dispersion medium, and the internal temperature was adjusted to 75° C. Then a mixture of the prepolymeric catalyst (2.4 $\mu$mol in terms of zirconium) prepared above and 3.0 mmol of triisobutylaluminum was charged into the autoclave. Immediately, gaseous ethylene was introduced therein continuously to keep the internal pressure of the autoclave at 8 kg/cm$^2$G to allow the polymerization to proceed at 80° C. for 30 minutes. After the end of the polymerization, the autoclave was cooled, the unreacted gas was removed, and the mixture of the formed polymer and the sodium chloride was taken out. The mixture was washed with pure water to dissolve off the sodium chloride. The undissolved matter was dried to obtain 22 g of polymer.

EXAMPLE 11

(Polymerization)

A 2-liter stainless-steel autoclave equipped with a magnetic stirrer was purged sufficiently with nitrogen. Therein, 200 g of sodium chloride which had been dried at 200° C. for 20 hours as the dispersion medium, and the internal temperature was adjusted to 75° C. Then a mixture of the prepolymeric catalyst (2.4 $\mu$mol in terms of zirconium) prepared in Example 9 and 1.5 mmol of triisobutylaluminum was charged into the autoclave. Immediately, gaseous ethylene was introduced therein continuously to keep the internal pressure of the autoclave at 8 kg/cm$^2$G to allow the polymerization to proceed at 80° C. for 30 minutes. After the end of the polymerization, the autoclave was cooled, the unreacted gas was removed, and the mixture of the formed polymer and the sodium chloride was taken out. The mixture was washed with pure water to dissolve off the sodium chloride. The undissolved matter was dried to obtain 22 g of polymer.

EXAMPLE 12

(Preparation of Prepolymeric Catalyst)

In a 1-liter glass autoclave, after nitrogen purge, was placed 300 ml of toluene. Thereto, was added successively 0.25 g of the modified clay prepared in Example 2, 3.8 mmol of triisobutylaluminum, and 17 $\mu$mol of bis(indenyl) zirconium dichloride. Ethylene was introduced thereto to keep the pressure at 1.5 kg/cm$^2$ to allow the prepolymerization to proceed with stirring at 60° C. for 30 minutes. After the prepolymerization, the solvent was eliminated by a filter e.g. a bridge or stick filter, and the solid matter was washed five times with 200 ml portions of hexane. Consequently, a prepolymeric catalyst containing 40 g of polyethylene per gram of the modified clay was obtained.

(Polymerization)

A 2-liter stainless-steel autoclave equipped with a magnetic stirrer was purged sufficiently with nitrogen. Therein, 200 g of sodium chloride which had been dried at 200° C. for 20 hours as the dispersion medium, and the internal temperature was adjusted to 75° C. Then a mixture of the prepolymeric catalyst (2.4 $\mu\mu$mol in terms of zirconium) prepared above and 3.0 mmol of triisobutylaluminum was charged into the autoclave. Immediately, gaseous ethylene was introduced therein continuously to keep the internal pressure of the autoclave at 8 kg/cm$^2$G to allow the polymerization to proceed at 80° C. for one hour. After the end of the polymerization, the autoclave was cooled, the unreacted gas was removed, and the mixture of the formed polymer and the sodium chloride was taken out. The mixture was washed with pure water to dissolve off the sodium chloride. The undissolved matter was dried to obtain 45 g of polymer.

EXAMPLE 13

(Preparation of Prepolymeric Catalyst)

In a 1-liter glass autoclave, after nitrogen purge, was placed 300 ml of toluene. Thereto, was added successively 0.25 g of the modified clay obtained in Example 2, 3.3 mmol of triisobutylaluminum, and 20 μmol of bis(1,3-dimethylcyclopentadienyl)zirconium dichloride. Ethylene was introduced thereto to keep the pressure at 2 kg/cm² to allow the prepolymerization to proceed with stirring at 60° C. for one hour. After the prepolymerization, the solvent was eliminated by a filter e.g. a bridge or stick filter, and the solid matter was washed five times with 200 ml portions of hexane. Consequently, a prepolymeric catalyst containing 30 g of polyethylene per gram of the modified clay was obtained.

(Polymerization)

A 2-liter stainless-steel autoclave equipped with a magnetic stirrer was purged sufficiently with nitrogen. Therein, 200 g of sodium chloride which had been dried at 200° C. for 20 hours as the dispersion medium, and the internal temperature was adjusted to 75° C. Then a mixture of the prepolymeric catalyst (2.8 μmol in terms of zirconium) prepared above and 2.6 mmol of triisobutylaluminum was charged into the autoclave. Thereto, butene-1 was introduced to give a pressure of 1 kg/cm². Immediately, gaseous ethylene was introduced therein continuously to keep the internal pressure of the autoclave at 8 kg/cm²G to allow the polymerization to proceed at 80° C. for one hour. After the end of the polymerization, the autoclave was cooled, the unreacted gas was removed, and the mixture of the formed polymer and the sodium chloride was taken out. The mixture was washed with pure water to dissolve off the sodium chloride. The undissolved matter was dried to obtain 33 g of copolymer, which had a melting point of 116° C., an MFR of 0.19 g/10 min, and a bulk density of 0.28 g/cc.

EXAMPLE 14

(Preparation of Prepolymeric Catalyst)

In a 1-liter glass autoclave, after nitrogen purge, was placed 300 ml of toluene. Thereto, was added successively 0.25 g of the modified clay obtained in Example 2, 3.3 mmol of triisobutylaluminum, and 20 μmol of bis(1,3-dimethylcyclopentadienyl)zirconium dichloride. Ethylene was introduced thereto to keep the pressure at 2 kg/cm² to allow the prepolymerization to proceed with stirring at 30° C. for one hour. After the prepolymerization, the solvent was eliminated by a filter e.g. a bridge filter or stick filter, and the solid matter was washed five times with 200 ml portions of hexane. Consequently, a prepolymeric catalyst containing 34 g of polyethylene per gram of the modified clay was obtained.

(Polymerization)

A 2-liter stainless-steel autoclave equipped with a magnetic stirrer was purged sufficiently with nitrogen. Therein, 200 g of sodium chloride which had been dried at 200° C. for 20 hours as the dispersion medium, and the internal temperature was adjusted to 75° C. Then a mixture of the prepolymeric catalyst (2.8 μmol in terms of zirconium) prepared above and 2.6 mmol of triisobutylaluminum was charged into the autoclave. Thereto, butene-1 was introduced to give a pressure of 1 kg/cm². Immediately, gaseous ethylene was introduced therein continuously to keep the internal pressure of the autoclave at 8 kg/cm²G to allow the polymerization to proceed at 80° C. for 30 minutes. After the end of the polymerization, the autoclave was cooled, the unreacted gas was removed, and the mixture of the formed polymer and the sodium chloride was taken out. The mixture was washed with pure water to dissolve off the sodium chloride. The undissolved matter was dried to obtain 28 g of copolymer, which had a melting point of 117° C., an MFR of 0.53 g/10 min, and a bulk density of 0.35 g/cc.

As described above, the novel catalyst of the present invention has high activity for olefin polymerization without an expensive organoaluminumoxy compound or a special boron compound.

What is claimed is:

1. A catalyst for the polymerization of an olefin, comprising a clay mineral (a) which has been modified by treating with a compound (b) represented by the formula:

$$(C^+)(A^-)$$

where ($C^+$) is a cation and ($A^-$) is an anion to introduce the cation into a layered interspace in the clay mineral; a metallocene compound (c); and an organoaluminum compound (d);

wherein the cation ($C^+$) is selected from the group consisting of trimethylammonium ion, triethylammonium ion, tripropylammonium ion, tributylammonium ion, N,N-dimethylanilinium ion, N,N-diethylanilinium ion, N,N-2,4,5,-pentamethylanilinium ion, triphenylphosphonium ion, tri(o-tolyl)phosphonium ion, tri(p-tolyl) phosphonium ion, tri(mesityl)phosphonium ion, dimethyloxonium ion, diethyloxonium ion, carbonium ions, sulfonium ions, silver ion and ferrocenium ion; and wherein the anion ($A^-$) is selected from the group consisting of fluoride ion, chloride ion, bromide ion, iodide ion, sulfate ion, hexafluorophosphate ion, tetrafluoroborate ion and tetraphenylborate ion, wherein cation exists in the clay mineral (a) and the cation is allowed to react with an equimolar or greater amount of compound (b).

2. A catalyst for the polymerization of an olefin, comprising a first catalyst component prepared by prepolymerizing an olefin with a prepolymerization catalyst comprising a clay mineral (a) which has been modified by treating with a compound (b) represented by the general formula:

$$(C^+)(A^-)$$

where ($C^+$) is a cation and ($A^-$) is an anion to introduce the cation into a layered interspace in the clay mineral; a metallocene compound (c); a first organoaluminum compound (d); and, as a second catalyst component, a second organoaluminum compound (e);

wherein the cation ($C^+$) is selected from the group consisting of trimethylammonium ion, triethylammonium ion, tripropylammonium ion, tributylammonium ion, N,N-dimethylanilinium ion, N,N-diethylanilinium ion, N,N-2,4,5,-pentamethylanilinium ion, triphenylphosphonium ion, tri(o-tolyl)phosphonium ion, tri(p-tolyl) phosphonium ion, tri(mesityl)phosphonium ion, dimethyloxonium ion, diethyloxonium ion, carbonium ions, sulfonium ions, silver ion and ferrocenium ion; and wherein the anion ($A^-$) is selected from the group consisting of fluoride ion, chloride ion, bromide ion, iodide ion, sulfate ion, hexafluorophosphate ion, tetrafluoroborate ion and tetraphenylborate ion, wherein cation exists in the clay mineral (a) and the cation is allowed to react with an equimolar or greater amount of compound (b).

3. The catalyst according to claim 1 or 2, wherein said clay mineral is selected from the group consisting of biophilite, kaolinite, dickalite, talc having a negative charge of zero, smectite having a negative charge of from 0.25 to 0.6, vermiculite having a negative charge of from 0.6 to 0.9, mica having a negative charge of about 1 and brittle mica having a negative charge of about 2.

4. The catalyst according to claim 3 wherein said metallocene compound (C) is represented by general formula (1) or (2):

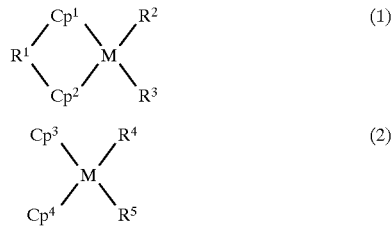

wherein $Cp^1$, $Cp^2$, $Cp^3$ and $Cp^4$ are independently a substituted or unsubstituted cyclopentadienyl group, $R^1$ is an alkylene group, a substituted alkylene group, a dialkylsilanediyl group, a dialkylgermanediyl group, an alkylphosphinediyl group, or an alkylimino group, $R^1$ crosslinks $C_p^1$ and $C_p^2$ together, M is a transition metal of Group IVB of the Periodic Table and $R^2$, $R^3$, $R^4$ and $R^5$ are independently a hydrogen atom, a halogen atom or a hydrocarbon, alkoxy or aryloxy group having 1 to 12 carbon atoms.

5. The catalyst according to claim 4 wherein said organoaluminum compound (d) is represented by the general formula $Al(R^6)_3$ wherein each $R^6$ is independently hydrogen, halogen, an amido group, an alkyl group, an alkoxy group or an aryl group, and at least one of one of $R^6$ is an alkyl group.

6. The catalyst according to claim 4, wherein said organoaluminum compounds (d) or (e) are represented by the general formula $Al(R^6)_3$ wherein each $R^6$ is independently hydrogen, halogen, an amido group, an alkyl group, an alkoxy group or an aryl group, and at least one of one of $R^6$ is an alkyl group.

7. The catalyst according to claim 5 wherein said clay mineral is smectite.

8. The catalyst according to claim 5 wherein said clay mineral is montmorillonite.

9. The catalyst according to claim 5 wherein said clay mineral is hectonite.

10. The catalyst according to claim 6 wherein said clay mineral is smectite.

11. The catalyst according to claim 6 wherein said clay mineral is montmorillonite.

12. The catalyst according to claim 6 wherein said clay mineral is hectonite.

* * * * *